United States Patent [19]

Osafune

[11] Patent Number: 4,931,889
[45] Date of Patent: Jun. 5, 1990

[54] METHOD AND APPARATUS DEPENDING ON THE SELECTED POWER SOURCE FOR CONTROLLING THE POSITIONING OF A RECORDING/REPRODUCING APPARATUS

[75] Inventor: Koji Osafune, Tokyo, Japan

[73] Assignee: Kabushiki Kaisha Toshiba, Kawasaki, Japan

[21] Appl. No.: 200,051

[22] Filed: May 27, 1988

[30] Foreign Application Priority Data

May 30, 1987 [JP] Japan .............................. 62-136269

[51] Int. Cl.$^5$ .............................................. G11B 21/08
[52] U.S. Cl. .................................. 360/78.07; 360/69;
360/78.04; 360/78.06; 364/32
[58] Field of Search ....................... 360/69, 72.2–72.3,
360/73.05–73.08, 73.03, 75, 78.04, 78.06, 78.07,
78.01, 78.02; 369/32, 33, 41; 318/561

[56] References Cited

FOREIGN PATENT DOCUMENTS 62-75982 4/1987 Japan ................................. 360/78.07

OTHER PUBLICATIONS

Digital Magnetic Recording Technique Trikkeps (transliterated) 1986 1-25 pp. 151 to 157.

Primary Examiner—Robert L. Richardson
Assistant Examiner—Steven R. Garland
Attorney, Agent, or Firm—Cushman, Darby & Cushman

[57] ABSTRACT

A control apparatus for controlling the positioning of a head in a recording/reproducing apparatus is provided which comprises a carriage mechanism having a head, a switch for selecting one of a battery and a power source using commercial power source, a driving section for driving the carriage mechanism, in accordance with incoming velocity difference data, by a current which comes from a power selected by the switch, a velocity difference detector for generating the velocity difference data on the basis of incoming target velocity data and current velocity data and for delivering the velocity difference data to the driving section, a current position detector for detecting a current position of the head to produce current position data, a current velocity detector for generating the current velocity data from the current position data from the current position detector and a target velocity generator for generating the target velocity data on the basis of incoming target position data and the current position data from the current position detector and for delivering it to the velocity difference detector. The mode select signal is determined in association with the selection of the switch.

7 Claims, 3 Drawing Sheets

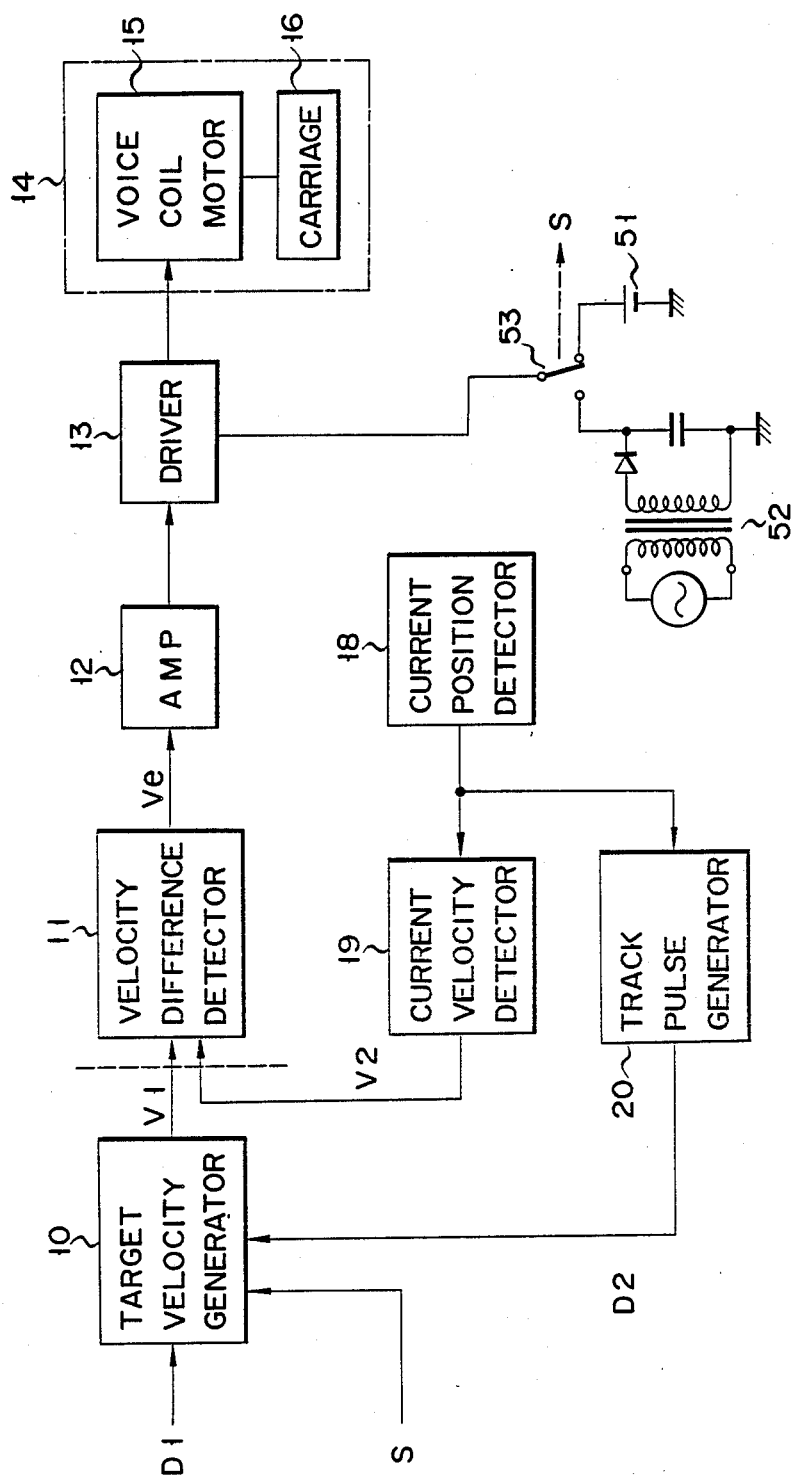
F I G. 1

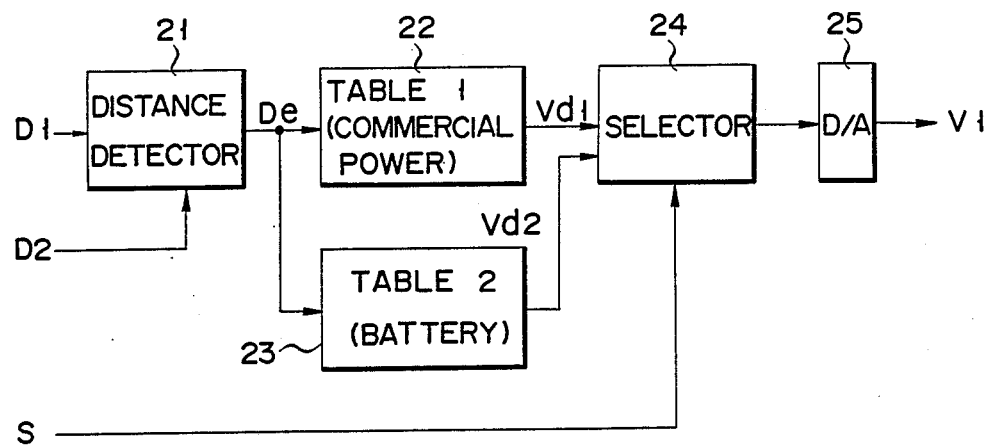
FIG. 2
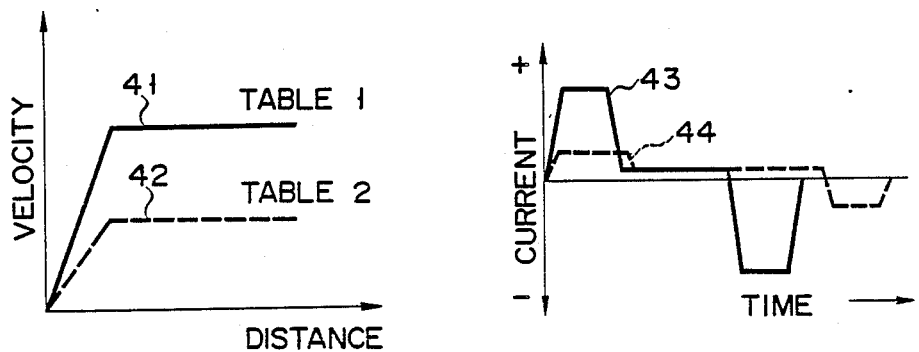
FIG. 3
FIG. 4
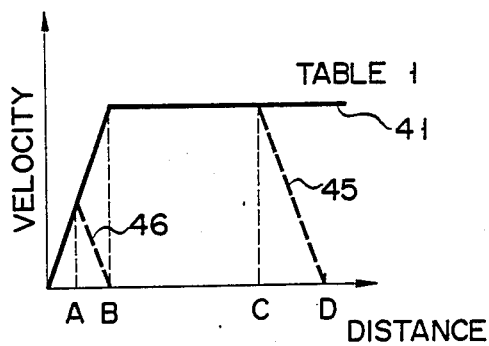
FIG. 5

METHOD AND APPARATUS DEPENDING ON THE SELECTED POWER SOURCE FOR CONTROLLING THE POSITIONING OF A RECORDING/REPRODUCING APPARATUS

BACKGROUND OF THE INVENTION

1. Field of the Invention

The present invention relates to an apparatus for controlling the positioning of a recording/reproducing apparatus and, in particular, a method and apparatus for controlling the positioning of a magnetic head of a magnetic recording/reproducing apparatus using both a battery drive mode and commercial power source drive mode.

2. Description of the Related Art

Recently, hard disc apparatus and floppy disk apparatus, for example, have been developed as compact units and are utilized as external memory devices for mini-computers, compact word-processors, etc.

Some mini-computers and compact word-processors are of a battery drive type and, therefore, a battery-powered device has been developed for compact hard disc devices.

In the hard disk devices, for example, a voice coil motor is used to control the positioning of a magnetic head in which case a substantially proportional relation exists between the access speed (the seek speed of a magnetic head) and the dissipation current. In the battery drive mode, the dissipation power on the hard disk apparatus should be restricted due to the restricted battery power capacity. Thus the battery-powered hard disk apparatus involves a reduced access speed.

It has been customary to, even upon the use of the battery drive system, employ a commercial power source of a greater power capacity in combination with it. If the access speed suitable for the commercial power source drive system is used, it will be necessary to use, in the case of the battery drive system, a battery of a great power capacity corresponding to that of the commercial power source system.

SUMMARY OF THE INVENTION

It is accordingly the object of the present invention to provide a control apparatus of a recording/reproducing apparatus which, in a battery drive mode, restricts a dissipation power necessary to control the positioning of the head and, in a commercial power source mode, allows a high access velocity, whereby it is possible to properly control the positioning of the head in either mode.

According to the present invention a control apparatus is provided which comprises a carriage mechanism having a head; a switch for selecting one of a battery and a power source using commercial power source, a driving section for driving the carriage mechanism, in accordance with incoming difference data, by a current which comes from the power source selected by the switch; a velocity difference detector for generating the velocity difference data on the basis of incoming target velocity and current velocity data and for delivering the velocity difference data to the driving section, a current position detector for detecting the current position of the head to generate current position data; a current velocity detector for generating the current velocity data on the basis of the current position data of the current position device; and a target velocity generator for generating the target velocity data, in accordance with an incoming mode select signal, on the basis of incoming target position data and the current position data from the current position detector and delivering the target velocity data to the velocity difference detector. The mode select signal is decided in association with the selection of the switch.

According to the present invention, in a battery drive mode (a low dissipation power mode), a dissipation power necessary to control the positioning of the magnetic head can be restricted by reducing the travelling velocity of the carriage to a relatively low one. As a result, it is possible to positively control the positioning of the magnetic head in the battery drive mode without the need of using any battery of a greater power capacity.

In the commercial power source drive mode (a high dissipation power mode), the travelling velocity of the carriage is made a relatively high one, assuring a high access speed. The use of a combination of the respective modes ensures that the positioning of the magnetic head fitted for the respective modes can properly controlled.

BRIEF DESCRIPTION OF THE DRAWINGS

FIG. 1 is a block diagram showing a control apparatus according to one embodiment of the invention;

FIG. 2 is a block diagram showing a first form of a target velocity generator in the control apparatus of FIG. 1;

FIG. 3 is a graph showing the contents of tables 1 and 2 in FIG. 2;

FIG. 4 is a graph showing a dissipation current in a battery drive mode and commercial power source mode;

FIG. 5 is a view for explaining the operation of the control apparatus;

DESCRIPTION OF THE PREFERRED EMBODIMENT

Figure 6:
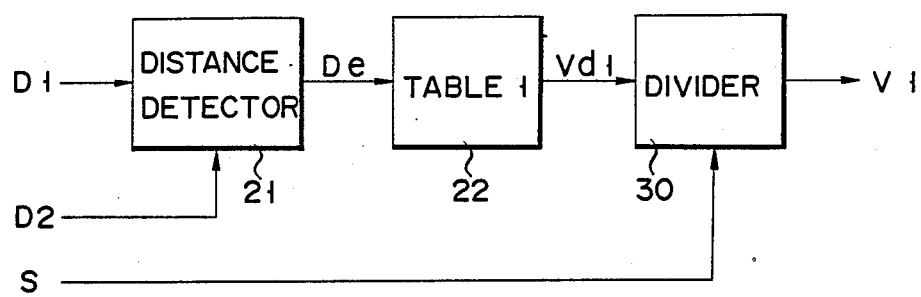
FIG. 6 is a block diagram showing a second form of a target velocity generator in the control apparatus of FIG. 1.

The control apparatus of the present invention will be explained below in conjunction with, for example, a magnetic head positioning control unit for hard disc apparatus by referring to the accompanying drawings.

The control apparatus according to the embodiment of the present invention will be explained below with reference to FIG. 1.

In the circuit arrangement shown in FIG. 1, target velocity generator 10 compares target position signal D1 of a magnetic head, which is generated from a controller (HDC; not shown), with input current position signal D2 to provide a position difference or a distance. Target velocity generator 10 delivers a target velocity signal V1, which is determined in accordance with the distance and incoming mode select signal S, to velocity difference detector 11. The signal D1 represents the number of tracks to be travelled by a magnetic head and signal D2 represents the current track position of the magnetic head and is output from track pulse generator 20 to target velocity generator 10. Velocity difference detector 11 detects a difference between the target velocity signal V1 from target velocity generator 10 and an input velocity signal V2 of the magnetic head to deliver signal Ve corresponding to the velocity difference to amplifier 12. The current velocity signal V2 is delivered from current velocity detector 19 to velocity difference detector 11.

Amplifier 12 amplifies the velocity signal Ve and delivers the amplified signal to driver 13. Driver 13 drives voice coil motor 15, in accordance with the amplified signal, through a drive current which is supplied from battery 51 or power source 52 using commercial power source via switch 53. A state of signal S is determined in accordance with the selection of switch 53. Motor 15 drives carriage 16 with the magnetic head mounted thereon. Motor 15 and carriage 16 constitute magnetic head positioning mechanism 14.

Current position detector 18 delivers a current position signal, on the basis of servo data on the disk, which corresponds to the current position of the magnetic head. Current velocity detector 19 differentiates the current position signal delivered from detector 18 into the aforementioned current velocity signal V2. Track pulse generator 20 is responsive to the position signal from detector 18 to generate a pulse each time the magnetic head moves across the respective track. Track pulse generator 20 supplies the count value as the current position signal D2 to target velocity generator 10.

FIG. 2 shows a block diagram showing one form of target velocity generator 10. In FIG. 2, distance detector 21 compares the signal D1 with the signal D2 and delivers the distance signal De corresponding to the position difference to first and second target velocity tables 22 and 23. Table 22 stores target velocity data in a commercial power source drive mode (a high power dissipation mode) and delivers target velocity signal Vd1 corresponding to the target velocity data determined in accordance with the distance signal De. Table 23, stores target velocity data in a battery drive mode (a low dissipation power mode) and delivers target velocity signal Vd2 corresponding to the target velocity data determined in accordance with the distance signal De. Selector 24 selects either one of the target velocity data Vd1 and Vd2 in accordance with mode select signal S from, for example, the HDC (not shown) and delivers the selected one to D/A converter 25. Signal S is associated with the selection of switch 53 and determined by either the battery drive mode or the commercial power source mode. D/A converter 25 receives the target velocity signal Vd1 or Vd2 from selector 24 and converts it to target velocity signal V1 which is an analog signal.

The operation of the embodiment according to the present invention will be explained below:

The positioning control of the magnetic head is broadly classified into a velocity control made up to the target track and a center position control made to the target track. In this connection it is to be noted that the present invention relates to the velocity control (seek control) and that the explanation of the position control is omitted.

Upon the generation of position signal D1 from the controller, target velocity generator 10 delivers, to velocity difference detector 11, the target velocity signal V1 corresponding to a difference between current position signal D2 and target position signal D1. The current position signal D2 is a signal representing the current track position of the magnetic head which is output from track pulse generator 20. Generator 20 is responsive to the position signal from current position detector 18 to generate a pulse each time the magnetic head moves across the respective track, and to supply a count value as current position signal D2.

As shown in FIG. 2 in more detail, distance detector 21 in target velocity generator 10 finds a difference between target position signal D1 and the current position signal D2, that is, the distance for the magnetic head to be moved to the target track, and supplies the distance signal De to table 22. Table 22 supplies the target velocity signal Vd1 corresponding to the distance signal De to selector 24. That is, table 22 has a velocity characteristic as indicated by 41 in FIG. 3 and, in this case, the magnetic head is moved at a relatively high speed. Table 23 delivers the target velocity data Vd2 to selector 24 in accordance with signal De, and has the velocity characteristic as indicated by 42 in FIG. 3 to enable the magnetic head to move or seek at a relatively low speed.

Now let it be assumed that the hard disc apparatus is driven in the battery drive mode and that, for example, the controller delivers a mode select signal S representing the battery drive mode (the low dissipation power mode). Upon receipt of mode select signal S, selector 24 selects the target velocity data Vd2 coming from table 23 and supplies a corresponding output to D/A converter 25. D/A converter 25 converts the target velocity signal Vd2 to target velocity analog signal V1. Velocity difference detector 11 detects a difference between target velocity speed V1 and current velocity signal V2 of the magnetic head and supplies the velocity difference signal Ve to amplifier 12. Detector 19 differentiates the position signal, which is output from current position detector 18, into the current velocity signal V2 for supply to velocity difference detector 11.

A drive current is supplied to coil motor 15 by means of amplifier 12 and driver 13 in accordance with velocity difference signal Ve. Since, in this case, the battery drive mode (the low dissipation power mode) is selected, a drive current with a relatively low current characteristic as indicated by a dotted line 44 in FIG. 4 is supplied to motor 15.

If the hard disc apparatus is to be driven in the commercial power source drive mode, then mode select signal S representing the commercial power source mode (the high dissipation power mode) is fed to selector 24. Upon receipt of this signal S, selector 24 selects the target velocity signal Vd1 coming from table 22 and conveys it to D/A converter 25. D/A converter 25 converts the data Vd1 to target velocity analog signal V1. Velocity difference detector 11 detects a difference between the signal V1 and the current velocity signal V2 of the magnet head to produce velocity difference signal Ve. In the commercial power source drive mode (the high dissipation power mode), a drive current with a relatively high current characteristic as indicated by a solid line 43 in FIG. 4 is supplied to motor 15.

Upon the movement of the magnetic head to the target track in the battery drive mode, the target velocity is set at a relatively low speed and hence a drive current of a relatively low level can be supplied to motor 15. If, in this case, the carriage velocity, that is, the seek velocity becomes doubled, then about a 4-fold energy is required as a dissipation power. In the battery drive mode, the dissipation power necessary to control the positioning of the magnetic head can be largely reduced by reducing the target velocity. Upon the movement of the magnetic head to the target track in the commercial power source drive mode, a greater dissipation is needed to move the carriage, but the target velocity can be set at a relatively high speed.

In the aforementioned embodiment, as shown in FIG. 5, when the current track position of the magnetic head moves away from the target track position, i.e., the head positions at distance D, carriage 16 is accelerated at a constant rate toward a fixed velocity. When the magnetic head reaches distance C, carriage 16 gets the same velocity as the target velocity and then is driven at a fixed velocity. When, on the other hand, the magnetic head gets to distance B, it is slowed down and reaches the target track.

With the magnetic head situated in position B, the carriage is first accelerated as it moves closer to the target track. Since the target velocity is gradually slowed down, the carriage gets to distance A where the carriage velocity coincides with the target velocity. Thereafter the carriage is slowed down along a downward full line in FIG. 5.

FIG. 6 is a block diagram showing a second form of a target velocity generator. In the arrangement shown in FIG. 6, table 22 is provided as the target velocity table and a target velocity Vd1 coming from table 22 is supplied to divider 30. The aforementioned mode select signal S is supplied to divider 30. Upon receipt of the signal S, divider 30 delivers an analog replica of the input velocity signal Vd1 or K×(velocity signal Vd1) analog signal where K=a predetermined constant. Thus it is possible to deliver a target velocity signal in either one of a battery drive mode and a commercial power source drive mode.

Figure 7:
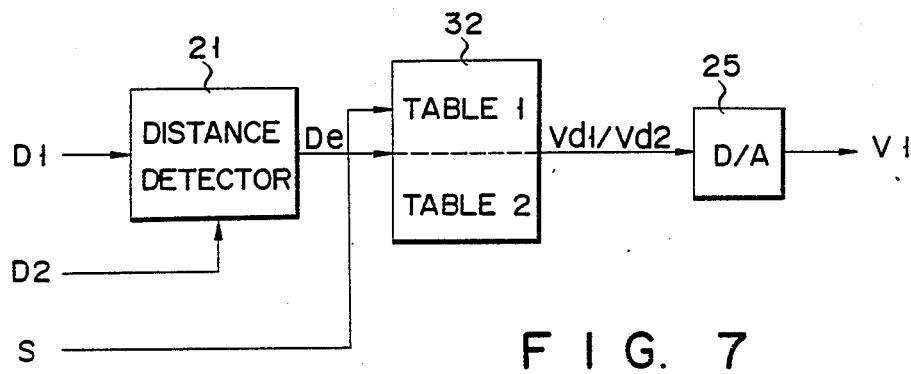
FIG. 7 is a block diagram showing a third form of a target velocity generator in the control apparatus of FIG. 1.

FIG. 7 is a block diagram showing a third form of a target velocity generator. In the arrangement shown in FIG. 7, target velocity table 32 comprises a table 1 and table 2. Table 32 supplies a target velocity Vd1 or Vd2 to D/A converter 25. Mode select signal S is supplied to table 32. Table 32 is implemented as one ROM where distance signal De from distance detector 21 becomes the address of the ROM. Signal S also functions as the MSB of the address to the ROM and is employed to switch an accessing area. It is thus possible to deliver a target velocity signal in the battery drive mode and commercial power source mode.

Figure 8:
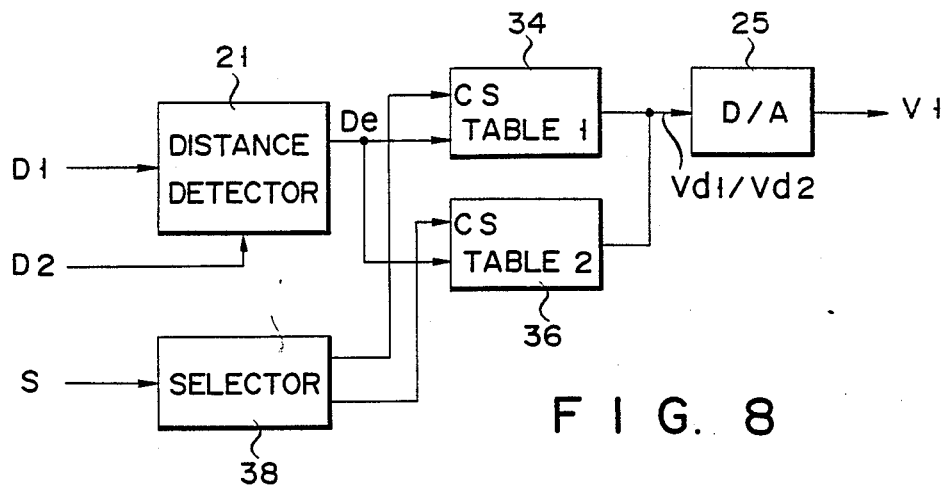
FIG. 8 is a block diagram showing a fourth form of a target velocity generator showing in FIG. 1.

FIG. 8 is a block diagram showing a fourth form of a target velocity generator. In the arrangement shown in FIG. 8, target velocity table comprises table 34 and table 36 and target velocities Vd1 and Vd2 are supplied respectively from tables 34 and 36 to D/A converter 25. Table 34 or 36 is implemented as two ROMs and distance signal De from distance detector 21 becomes the address of the ROM. Mode select signal S is supplied to selector 38. Upon receipt of the select signal S, selector 38 generates a chip select signal to allow one of table 34 and table 36 to be accessed. The outputs of these tables are, each, a tri-state one and are at a high impedance state unless these tables receive any chip select signal. It is thus possible to output the target signal in the battery drive mode and in the commercial power source mode.

Although, in the above-mentioned embodiment, the velocity characteristic has been explained as being relatively simply controlled, it will be obvious that it can be controlled in more sophisticated fashion. The case wherein the present invention is adapted for the hard disk apparatus is described in the above embodiments. However, the present invention can be adapted for a floppy disk apparatus or a optical disk apparatus. The present invention can be changed or modified in a variety of ways without departing from the spirit and scope of the present invention.

What is claimed is:

1. A control apparatus of a recording/reproducing apparatus for controlling the positioning efficiently irrespective of the kinds of power sources, comprising:
   a carriage mechanism including at least one head;
   switching means for selecting one from a plurality of power supply means;
   driving means for driving said carriage mechanism through said selected power supply means in accordance with incoming velocity difference data;
   velocity difference detecting means for determining said velocity difference data in accordance with incoming target velocity data and current velocity data, and for delivering said velocity difference data to said driving means;
   current position detecting means for detecting a current position of said head to produce current position data;
   current velocity detecting means for generating said current velocity data in accordance with said current position data from said current position detecting means, and for delivering said current velocity data to said velocity difference detecting means; and
   target velocity generating means for generating said target velocity data from incoming target position data and said current position data from said current position detecting means in accordance with an incoming mode select signal, and for delivering said target velocity data to said velocity difference detecting means.

2. The control apparatus according to claim 1, wherein said mode select signal is associated with the selection of said switching means.

3. The control apparatus according to claim 1, wherein said target velocity generating means comprises:
   first table means for storing first velocity data adapted for first power supply means of said plurality of power supply means and for outputting said first velocity data in accordance with incoming distance data;
   second table means for storing second velocity data adapted for second power supply means of said plurality of power supply means and for outputting said second velocity data in accordance with said incoming distance data;
   distance detecting means for generating said distance data in accordance with said incoming target position data and said current position data from said current position detecting means, and for outputting said distance data to said first and second table means; and
   selecting means for selectively outputting as said target velocity data one of said first velocity data from said first table means and said second velocity data from said second table means to said velocity difference detecting means in accordance with said incoming mode select signal.

4. The control apparatus according to claim 1, wherein said target velocity generating means comprises:
   first table means enabled in accordance with an incoming select signal, for storing first velocity data adapted for first power supply means of said plurality of power supply means and for outputting said first velocity data as said target velocity data in accordance with incoming distance data when said first table means is in the enabled state;

second table means enabled in accordance with said incoming select signal, for storing second velocity data adapted for second power supply means of said plurality of power supply means, and for outputting said second velocity as said target velocity data in accordance with said incoming distance data when said second table means is in the enable state;

distance detecting means for generating said distance data from said incoming target position data and said current position data from said current position detecting means, and for outputting said distance data to said first and second table means; and selecting means for outputting said select signal to one of said first and second table means in accordance with said incoming mode select signal.

5. The control apparatus according to claim 1, wherein said target velocity generating means comprises:

table means for storing first and second velocity data adapted for first and second power supply means of said plurality of power supply means, respectively and for outputting as said target velocity data one of said first and second velocity data in accordance with incoming distance data and said incoming mode select signal; and distance detecting means for generating said distance data from said incoming target position data and said current position data from said current position detecting means, and for delivering said distance data to said table means.

6. The control apparatus according to claim 1, wherein said target distance generating means comprises:

table means for storing velocity data adapted for first power supply means of said plurality of power supply means and for outputting said velocity data in accordance with incoming distance data;

distance detecting means for generating said distance data from said incoming target position data and said current position data from said current position detecting means, and for outputting said distance data to said table means; and multiplying means for multiplying the velocity data output from said table means, by a predetermined value in accordance with said incoming mode select signal, and for outputting the multiplied data as said target velocity data.

7. A method for efficiently controlling the positioning in a recording/reproducing apparatus irrespective of the kinds of power supplies, characterized by comprising:

selecting one of a first power supply and a second power supply by a switch;

generating a mode select signal in association with said selecting; and generating target velocity data from incoming target position data and current position data in accordance with said mode select signal.

* * * * *